(12) United States Patent
Stephens et al.

(10) Patent No.: US 7,878,701 B2
(45) Date of Patent: Feb. 1, 2011

(54) APPARATUS FOR PREPARING FOOD

(75) Inventors: Brian Stephens, Dublin (IE); Laurence Massey, Dublin (IE); Chris Duggan, Paris (FR)

(73) Assignee: Terraillon Holding Limited, Dublin (IE)

(*) Notice: Subject to any disclaimer, the term of this patent is extended or adjusted under 35 U.S.C. 154(b) by 915 days.

(21) Appl. No.: 11/547,204

(22) PCT Filed: Mar. 20, 2005

(86) PCT No.: PCT/EP2005/003492

§ 371 (c)(1),
(2), (4) Date: May 31, 2007

(87) PCT Pub. No.: WO2005/094648

PCT Pub. Date: Oct. 13, 2005

(65) Prior Publication Data

US 2007/0263482 A1    Nov. 15, 2007

(30) Foreign Application Priority Data

Mar. 30, 2004  (IE) ............................... S2004/0207

(51) Int. Cl.
*A47J 43/046* (2006.01)
(52) U.S. Cl. ..................................... 366/145; 366/314
(58) Field of Classification Search ................ 366/145, 366/146, 251, 314
See application file for complete search history.

(56) References Cited

U.S. PATENT DOCUMENTS

| | | | | |
|---|---|---|---|---|
| 3,606,274 A | * | 9/1971 | Nelson | 366/293 |
| 5,636,923 A | * | 6/1997 | Nejat-Bina | 366/205 |
| 6,089,143 A | * | 7/2000 | Figueroa | 99/327 |
| 6,796,220 B2 | * | 9/2004 | Lee | 99/348 |

* cited by examiner

*Primary Examiner*—David L Sorkin
(74) *Attorney, Agent, or Firm*—Miller, Canfield, Paddock and Stone; Timothy Engling

(57) ABSTRACT

The present invention is concerned with an apparatus for preparing food (10), in particular baby food made from fresh vegetables or the like, the apparatus comprising a body (12) and heating means (32) adapted to heat and/or cook food placed within the body, preferably by steaming, the apparatus (20) also comprising a blending assembly (18) which is operable to blend food located within the body (12), preferably after said food has been cooked using the apparatus (10).

12 Claims, 7 Drawing Sheets

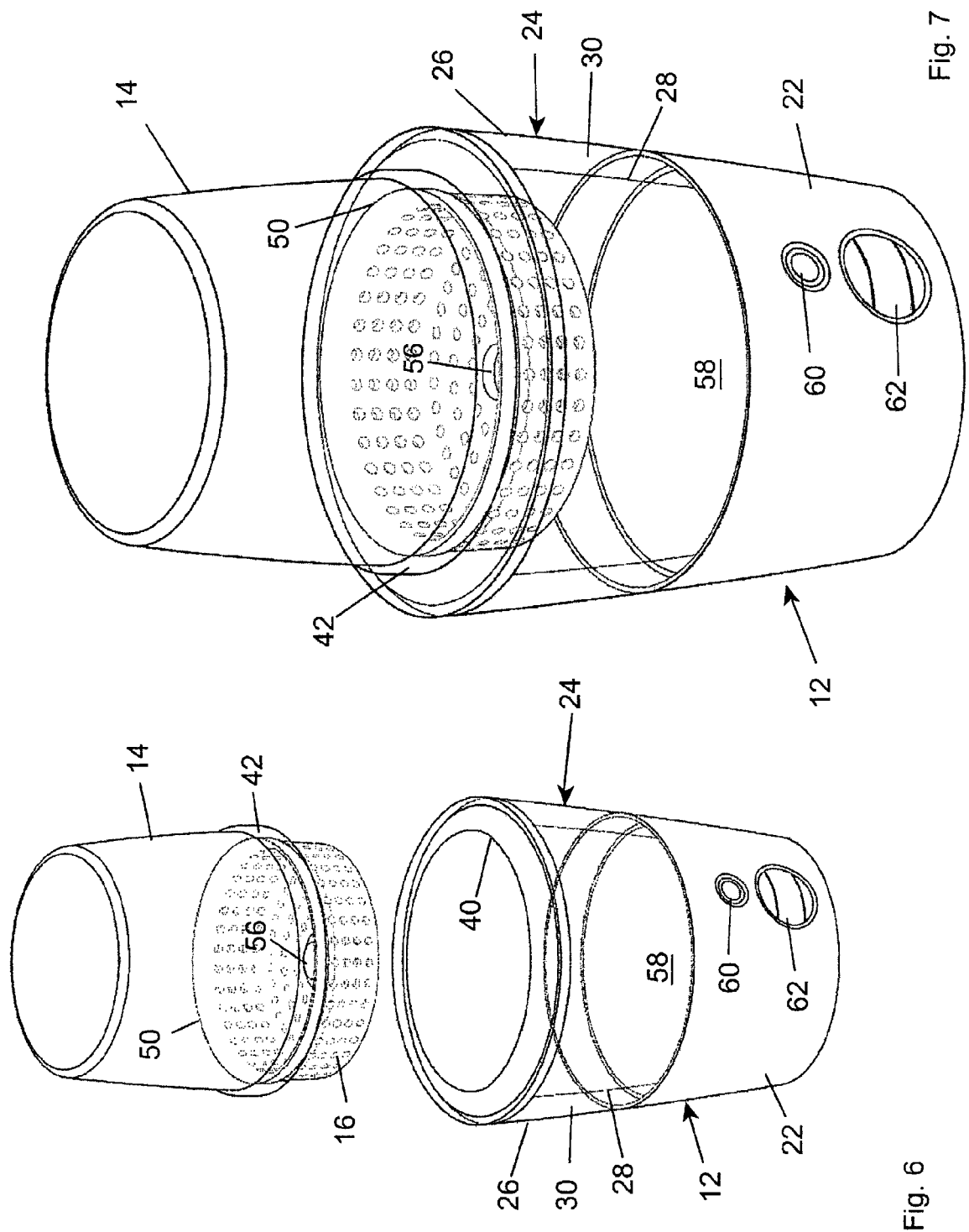

APPARATUS FOR PREPARING FOOD

The present invention is concerned with an apparatus for preparing food, in particular a combined heating and blending apparatus, for particular use in the preparation of baby food or the like.

Traditionally, baby food is prepared by boiling or steaming vegetables, preferably steaming to retain the maximum amount of nutrients, and subsequently mashing or blending the cooked vegetables, and allowing same to cool before feeding to a child.

However, in recent decades this practice has largely been replaced by the use of jars of ready made baby food. The main reason for this change in approach is due to the ever busier lifestyles lead by the majority of people, which obviously become that much busier upon the birth of a new child. The traditional method of preparing baby food does require time, due to the number of steps involved, namely the initial preparation, such as peeling and chopping, of the vegetables, boiling a pot of water and steaming the vegetables over same, transferring the steamed vegetables to a bowl for blending, or into a dedicated blender, and blending same. Due to the time required, when preparing such traditional baby food, it is common to prepare a substantial volume of same, and to store the excess for use over a number of feedings. Thus it is generally also necessary to transfer the excess baby food into a suitable container for storage.

Although people do not normally have the time to prepare such traditional baby food, the majority of parents would prefer to feed their child such food, mainly for health reasons. Ready made baby food will often contain preservatives, colourings and flavourings, while traditional baby food contains only natural ingredients, the benefits of which are well documented.

It is therefore an object of the present invention to provide an apparatus which is capable of preparing baby food in the traditional manner as described above.

It is a further object of the present invention to provide an apparatus which reduces the time and effort necessary to prepare the baby food in the traditional manner.

It is a still further object of the present invention to provide such an apparatus which is compact, and suitable for both counter-top use and storage.

The present invention therefore provides an apparatus for preparing food comprising a body within which food may be placed; heating means in operative association with the body, such that food may be heated within the body; drive means in operative association with the body; and a blending assembly locatable within the body, in operative association with the drive means, such that food may be blended within the body.

Preferably, the body is adapted to receive water adjacent the heating means, for conversion to steam by the heating means, in order to allow food to be steamed within the body.

Preferably, the body comprises a base within which the heating means is located, and a cylindrical sidewall extending from the base, such as to define an enclosure within which food may be placed for heating/blending.

Preferably, the apparatus further comprises a top within which the drive means is located, the top being securable to the body.

Preferably, the apparatus comprises a perforated bowl removably locatable within the body, in which bowl food may be placed for heating.

Preferably, when the perforated bowl is mounted within the body, a space exists between the perforated bowl and the base, for receiving water for conversion to steam.

Preferably, the perforated bowl has an aperture therein through which the blending assembly may project in order to allow the perforated bowl and the blending assembly to be simultaneously stored within the body.

Preferably, the apparatus comprises a container removably locatable within the body, the container being shaped and dimensioned to substantially receive the blending assembly therein, in order to allow food to be blended within the container.

Preferably, the perforated bowl may be substantially housed within the container in order to allow the perforated bowl, the container, and the blending assembly to be simultaneously stored within the body.

Preferably, the container is substantially cylindrical and has a single open end which is engagable about a rim of the perforated bowl in order to increase the effective volume of the perforated bowl.

Preferably, the apparatus comprises a lid securable about the open end of the container, the lid having an aperture for the passage of the blending assembly, thereby allowing the lid to be secured to the container during blending.

Preferably, the lid comprises a panel displaceable between a position exposing the aperture, and a position occluding the aperture.

Preferably, the cylindrical sidewall comprises an inner wall and a concentrically located outer wall defining a cavity therebetween.

Preferably, the temperature of the heating means may be varied.

Preferably, the apparatus may be stored with the container within the body, the perforated bowl within the container, the blending assembly within the container and projecting through the perforated bowl, the lid mounted to the container and the top mounted to the body such as to enclose the container/bowl/blade assembly therein.

As used herein, the term "blending assembly" is intended to mean an implement which is capable of blending food, and may be in the form of one or more blades mounted to a suitable support.

As used herein, the term "perforated bowl" is intended to mean any receptacle through which steam may pass for the purpose of heating and/or cooking food located in the receptacle.

The present invention will now be described with reference to the accompanying drawings, in which;

FIG. 6 illustrates a perspective partially exploded view of the apparatus of the present invention, in a steaming configuration;

FIG. 7 illustrates a perspective view of the apparatus of the present invention in the steaming configuration.

Figure 1:
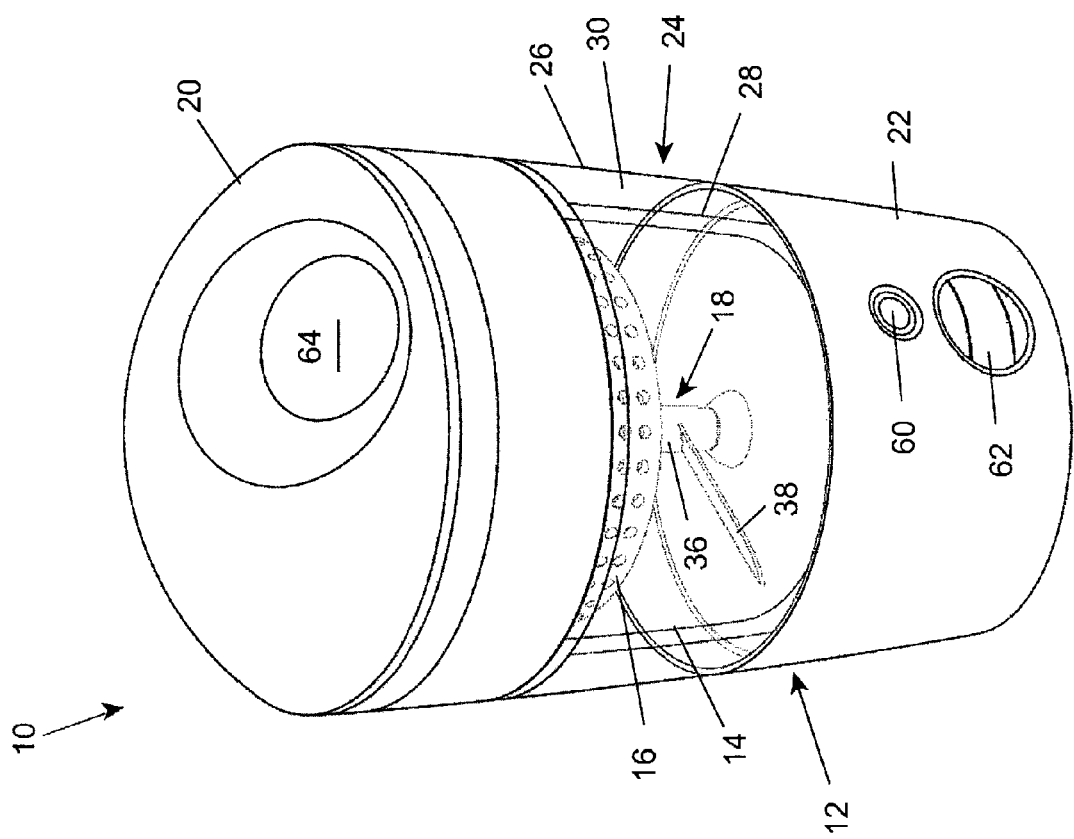
FIG. 1 illustrates a perspective view of an apparatus for preparing food according to the present invention, in a storage state.
Figure 2:
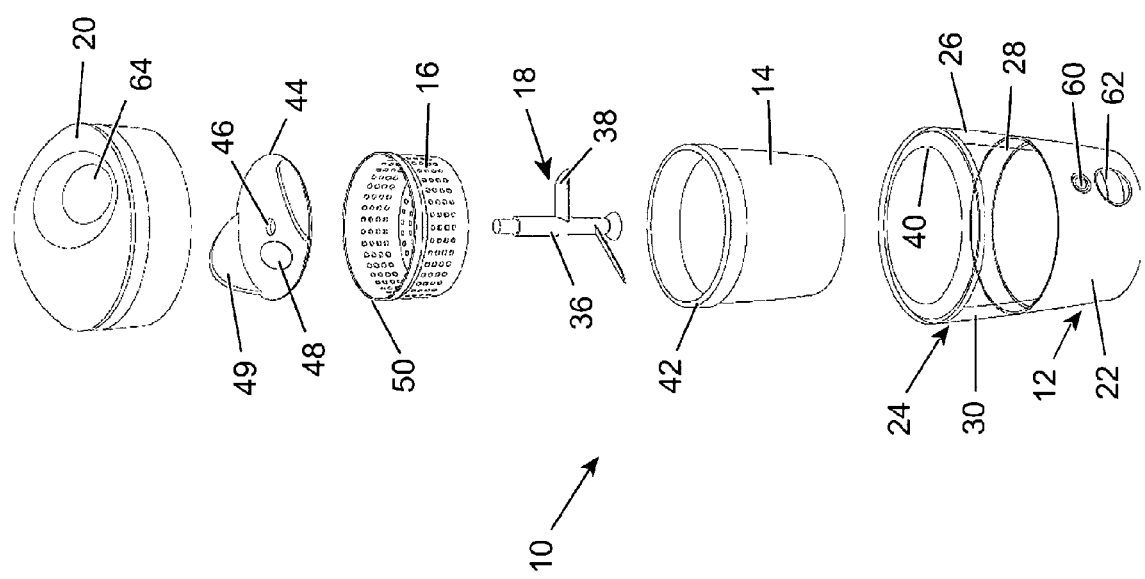
FIG. 2 illustrates a perspective exploded view of the apparatus of FIG. 1.

Referring now to the accompanying drawings, there is illustrated an apparatus for preparing food, generally indicated as 10, for particular use in steaming food such as vegetables or the like, and subsequently blending same for use as naturally prepared baby food (not shown). The apparatus 10 is primarily intended to be used as a counter-top unit, and is consequently designed such that all of the components thereof, as will be described hereinafter, may be simultaneously located within the apparatus 10 for storing, as shown in FIG. 1.

The apparatus 10 comprises a body 12 within which may be located a container 14 in which food may be blended, a perforated bowl 16 within which food may be steamed, and a blending assembly in the form of a blade assembly 18, for blending food within the container 14, the configuration and operation of each of which will be described hereinafter in detail. The apparatus 10 also includes a top 20 which may be secured about the body 12, in order to seal the interior thereof. The container 14, the perforated bowl 16, and the blade assembly 18 are removably locatable within the body 12, such that one or more of said components may be omitted in order to allow the correct operation of the remainder of said components, again as will be described hereinafter in detail. Thus the apparatus 10 forms a compact unit which is capable of performing a number of functions.

The body 12 comprises a base 22 extending from which is a cylindrical sidewall 24. The sidewall 24 consists of an outer cylindrical wall 26, and a concentrically disposed inner cylindrical wall 28, thereby defining a cavity 30 therebetween. This double wall configuration, preferably containing air within the cavity 30, acts to insulate the outer wall 26 from heat generated within the body 12 during the cooking or heating of food, as will be described hereinafter.

Located within the base 22 is heating means in the form of an element 32, which may be of any conventional form, preferably of the electrical resistance type. The element 32 is operable to heat water within the apparatus 10, in order to effect the heating/cooking of food located therein, as will be described hereinafter.

Turning then to the opposite end of the apparatus 10, the top 20 houses drive means in the form of an electric motor 34, although it will be appreciated that any other suitable motor (not shown) could be used. The motor 34 is releasably engagable with a shaft 36 of the blade assembly 18, as can be seen from FIG. 3. Thus the motor 34 can be actuated to effect rotation of the blade assembly 18, thereby utilising a pair of spaced apart blades 38, extending from the shaft 36, to blend food located within the container 14. The motor 34 and shaft 36 are preferably slideably engageable with one another, by means of, for example, a splined arrangement (not shown). However, any other suitable means of coupling the motor 34 and the shaft 36 could be used, which preferably enables separation of the two upon removal of the top 20 from the body 12.

Figure 3:
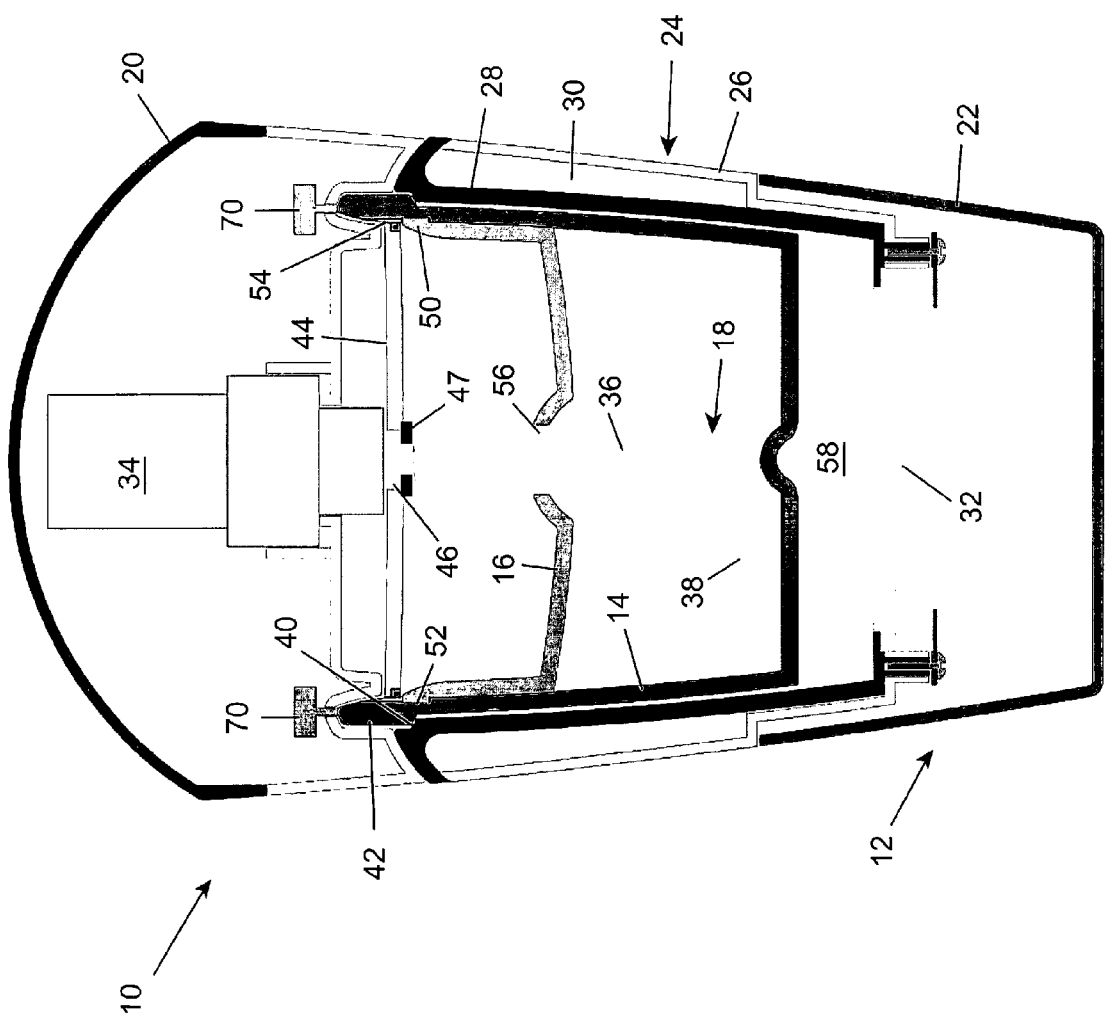
FIG. 3 illustrates a sectioned side elevation of the apparatus of FIG. 1.
Figure 5B:
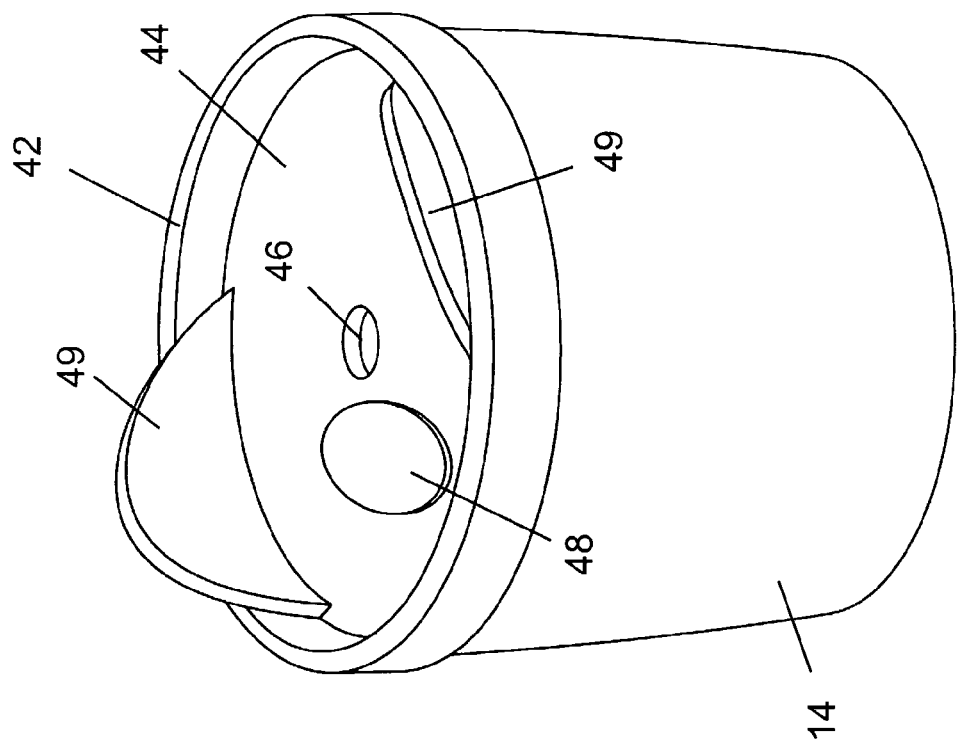
FIG. 5b illustrates a perspective view of the container and lid shown in FIG. 5a, in which the aperture in the lid is exposed.
Figure 5A:
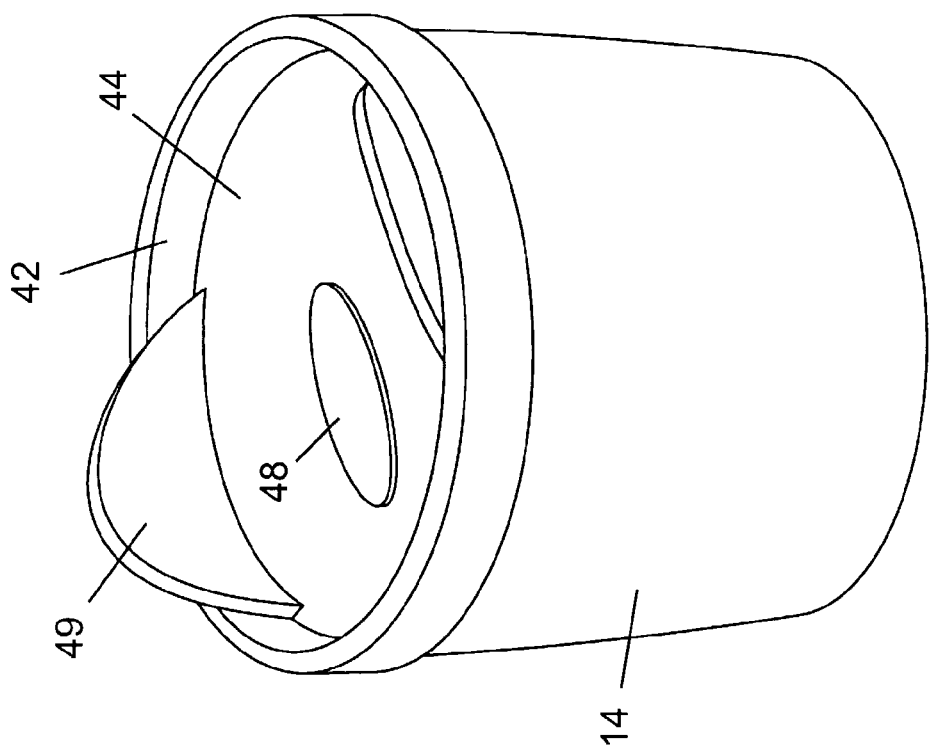
FIG. 5a illustrates a perspective view of a container and lid forming part of the apparatus of the present invention, in which an aperture in the lid is occluded.

Referring in particular to FIG. 3, the container 14 is removably locatable within the body 12, such as to facilitate the blending of food therein. In order to securely seat the container 14 within the body 12, the inner wall 28 is provided with a lip 40 at the upper end thereof, into which is locatable a correspondingly dimensioned collar 42, formed at the open end of the container 14. The apparatus 10 also preferably includes a lid 44 which may be pressed into place within the collar 42, such as to occlude the open end of the container 14. The lid 44 includes a central aperture 46 to facilitate the passage of the shaft 36 therethrough, in order to be capable of engaging the motor 34 while the lid 44 is in place. A gasket 47, formed from rubber or the like, is preferably provided beneath the central aperture 46, in order to create a substantially fluid tight seal between the shaft 36 and the lid 44. However, referring to FIG. 5, the lid 44 also includes a panel 48 which is displaceable between a position exposing the central aperture 46, to a position occluding same, the reasons for which will be set out hereinafter in detail. The lid 44 also preferably includes a pair of handles 49 projecting upwardly therefrom, which facilitate the insertion and removal of the lid 44, in addition to allowing the container 14 to be safely handled when hot. Although not illustrated, the underside of the top 20 is provided with a pair of suitably dimensioned recesses (not shown) for receiving the handles 49, when the top 20 is seated above the body 12.

With the container 14 seated within the body 12, the perforated bowl 16 may then be seated concentrically within the container 14, in similar fashion. Thus the perforated bowl 16 is provided with a rib 50, with the container 14 being provided with a correspondingly dimensioned channel 52 into which this rib 50 may be seated, in order to secure the perforated bowl 16 within the upper end of the container 14. Releasable retaining means, preferably in the form of bayonet clips 54, are preferably provided adjacent the channel 52, in order to securely retain the perforated bowl 16 within the container 14. Thus it can be seen that, by suitably designing the shape and configuration of the various components, both the blade assembly 18 and perforated bowl 16 may be simultaneously located within the container 14, which itself may be simultaneously located within the body 12. With all of the components located within the body 12, the top 20 may be mounted thereon, in order to securely contain the various components for storage. In order to facilitate this simultaneous storage of the various components, the perforated bowl 16 must include a central aperture 56 through which the shaft 36 passes, before passing through the central aperture 46 of the lid 44.

The apparatus 10 is designed to carry out a number of functions, in particular the initial cooking of food such as vegetables or the like, and the subsequent blending of same in order to produce baby food or the like. Therefore, turning to the first step of cooking food within the apparatus 10, the perforated bowl 16 is provided for this purpose. In order to create sufficient space above the element 32 for the introduction of water for boiling, the container 14 must be removed from the body 12. An enclosure 58 is then created above the element 32, into which may be introduced a suitable volume of water (not shown). The heating element 32 may then be actuated in order to boil the water, producing steam which rises upwardly through the perforated bowl 16, when mounted within the body 12, in order to steam cook the food contained therein.

However, due to the compact design of the apparatus 10, the volume of the perforated bowl 16 is relatively limited. In order to offset this limitation, and referring to FIGS. 6 and 7, the container 14, which must be removed from the body 12 during steaming, is shaped and dimensioned for a press fit over the rib 50 of the perforated bowl 16, in order to increase the effective volume of the perforated bowl 16. The complimentary design of the container 14 and perforated bowl 16 allows the container 14 to be upended as shown in FIG. 6, and pressed down into engagement with the rib 50. The rib 50 will therefore seat itself within the channel 52, with the bayonet clips 54 securing the container 14 and perforated bowl 16 together. The combined container 14 and perforated bowl 16 are then lowered into the body 12 as illustrated in FIG. 7, with the collar 42 of the container 14 again being dimensioned to securely sit into the lip 40 of the inner wall 28. Thus the perforated bowl 16 is now suspended above the enclosure 58, within which is contained a volume of water. With the perforated bowl 16 so located, the element 32 is actuated, thereby boiling the water within the enclosure 58. Thus steam rises up from the enclosure 58 and passes into the perforated bowl 16 containing the food, in order to cook same. The increased volume created by the combination of the perforated bowl 16 and the container 14 allows a significant increase in the amount of steam which is available to cook the food within the perforated bowl 16, thus reducing the time taken to cook the food.

In order to actuate the element 32, the base 22 is provided with a power button 60, and a timer 62 which may be utilised to set the duration of operation of the element 32.

Figure 4:
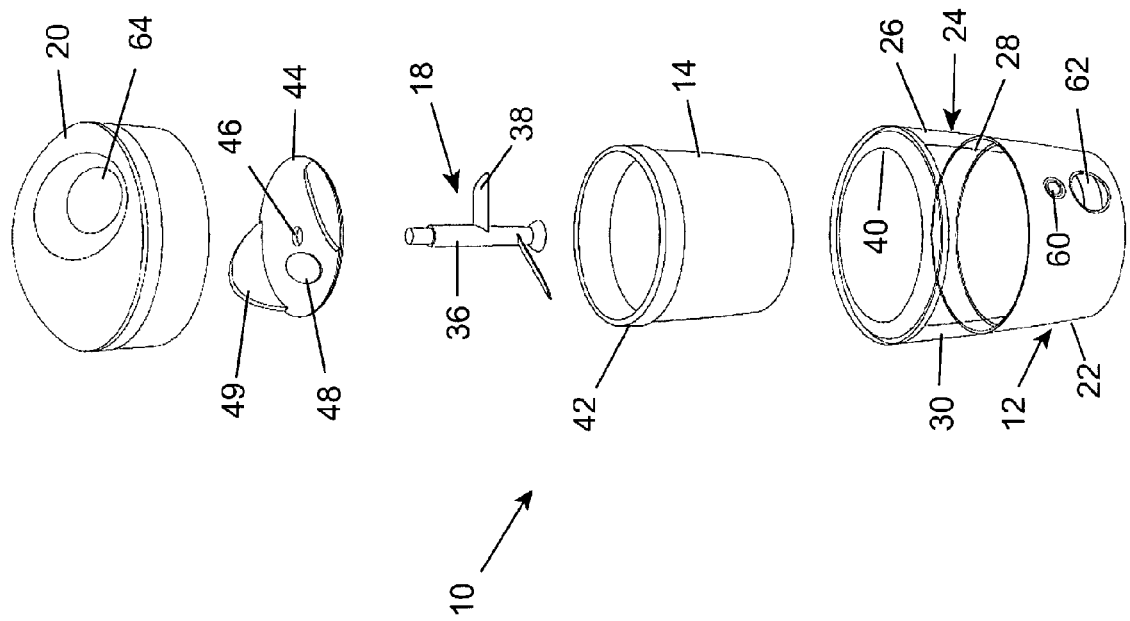
FIG. 4 illustrates an exploded perspective view of the apparatus of FIG. 1 in a blending configuration.

Once the food within the perforated bowl 16 is suitably cooked the container 14 and perforated bowl 16 may be lifted off the base 12, and separated from one another. The food contained within the perforated bowl 16 may then be transferred into the container 14, which may then be seated back into the body 12, to allow blending of the cooked food. Before the food is transferred into the container 14, the blade assembly 18 should be seated therein. Referring to FIG. 4, the lid 44 is then preferably secured to the open end of the container 14, with the shaft 36 of the blade assembly 18 passing through the central aperture 46. The top 20 may then be secured about the body 12, thereby sealing the container 14 therein. Once the top 20 is located in place, the motor 34 will be engaged with the shaft 36. Thus actuation of the motor 34 will effect rotation of the blade assembly 18, thereby blending any food located within the container 14. During this blending process, the lid 44 acts to prevent any food located within the container 14 from splashing upwardly onto the underside of the top 20.

As a safety measure, the top 20 includes a pair of micro-switches 70 in operative association with the underside of the top 20, which are depressed by the collar 42 when the top 20 is seated over the base 12, as can be seen from FIG. 3. The micro-switches 70 are suitably connected to the motor 34 such as to permit operation of the motor 34 only when the two micro-switches are depressed. Thus the motor 34 may only be operated when the top 20 is firmly located above the base 12.

In order to effect operation of the motor 34, a motor actuator 64 is provided on the top 20. It will of course be appreciated that any other suitable actuator (not shown) may be provided for this purpose.

Once the food located within the container 14 has been suitably blended, the top 20 is removed from the base 12, and the lid 44 removed from the container 14 in order to allow removal of the blade assembly 18. The food is then ready for serving, but should of course be allowed to cool sufficiently. However, as mentioned above, it is expected that in preparing such freshly made baby food, a greater quantity than is immediately necessary will generally be prepared, to be stored for later feedings. The design of the apparatus 10 therefore allows the container 14, within which the blended food is located, to be removed from the base 12, and the lid 44 replaced thereon in order to allow the food to be safely stored in a refrigerator (not shown) or the like. During such storage, the panel 48 is displaced over the central aperture 46 in order to occlude same, thereby ensuring that the container 14 is completely sealed.

Figure 8:
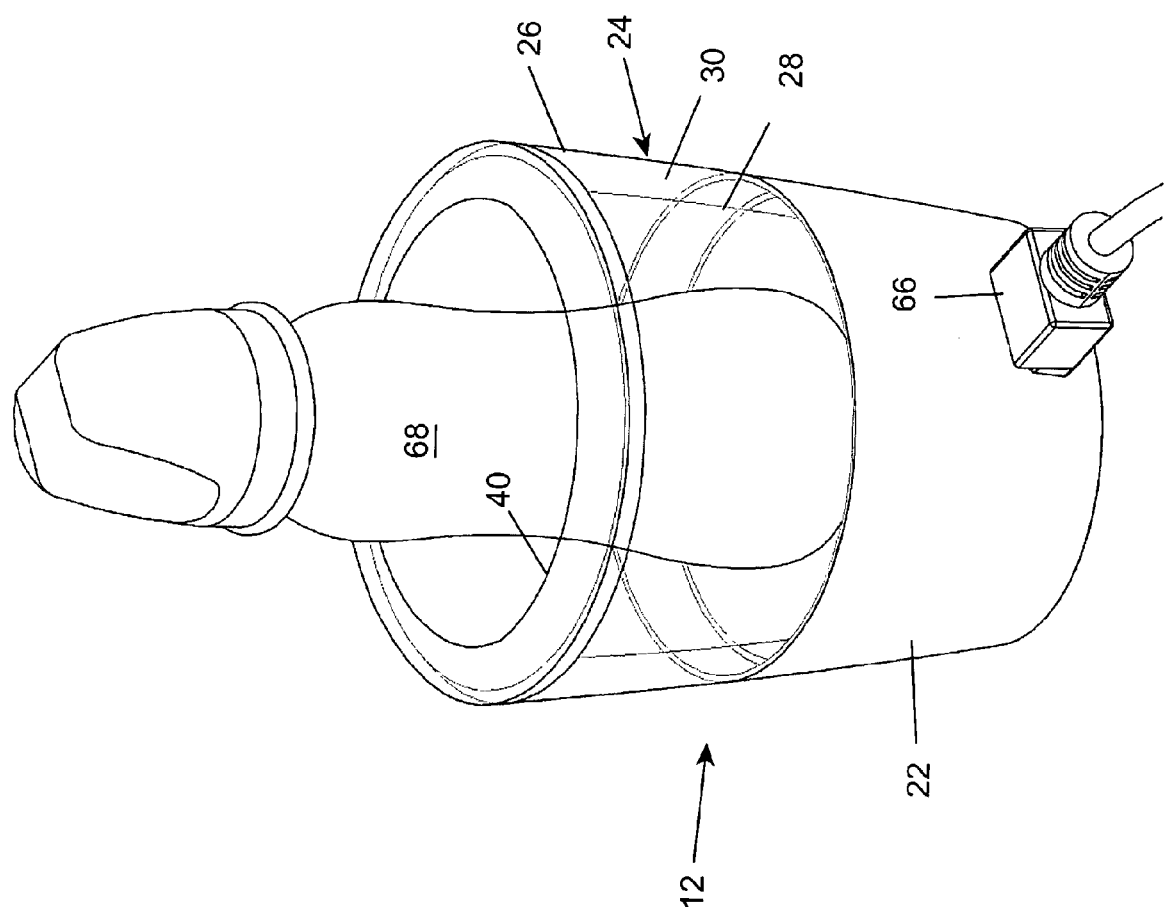
FIG. 8 illustrates a perspective view of a body of the apparatus of the present invention, within which is disposed the container of FIG. 5, and a child's bottle.

Referring to FIG. 8, the apparatus 10 can also be used for an additional function, which is also an integral part in the process of feeding a child. The top 20 may be removed from the base 12, and a volume of water introduced into the enclosure 58 above the element 32. An infant's bottle 68 or the like may then be seated within the body 12, and the element 32 actuated in order to heat the water within the enclosure 58. This will therefore heat any liquid contained within the bottle 68, for example milk or the like. Thus the apparatus 10 allows the heating of a bottle 68 or the like. Alternatively, as described above, excess baby food is likely to be prepared using the apparatus 10, and stored in the container 14 for later use. This excess baby food may be reheated by placing the container 14 into the body 12, such that the water in the enclosure 58 will surround the container 14. The element 32 is again actuated to heat the water, and consequently the baby food (or any other food) within the container 14.

FIG. 8 also shows a plug 66 which is connected into a socket (not shown) at the rear of the base 22, in order to provide power to the element 32. The top 20 is provided with a similar socket (not shown), into which the same plug 66 may be connected in order to provide power to the motor 34.

The container 14, the outer wall 26 and the inner wall 28 are preferably transparent, in order to allow inspection of the interior of the base 12, in particular to enable the visual determination of the condition of any food contained therein. These components are therefore preferably formed from a clear plastic or the like. The perforated bowl 16, the top 20, and base 22 are also preferably formed from a plastic or the like.

The use of these materials allows the straightforward and cost effective manufacture of the various components, while ensuring that the apparatus 10 is relatively lightweight, and also easily cleaned, in particular by being suitable to be placed in a dishwasher (not shown). The apparatus 10 thus provides a compact and versatile appliance for the preparation of, in particular, fresh baby food, while also enabling the heating of a child's bottle or similar items.

The invention claimed is:

1. An apparatus for preparing food comprising
a body within which food may be placed;
heating means in operative association with the body, such that food may be heated within the body;
drive means in operative association with the body;
a blending assembly locatable within the body, in operative association with the drive means, such that food may be blended within the body;
a perforated bowl removably locatable within the body, in which bowl food may be placed for heating; and
a container removably locatable within the body, the container being shaped and dimensioned to substantially receive the blending assembly therein, in order to allow food to be blended within the container, and in which container the perforated bowl may be substantially housed in order to allow the perforated bowl, the container, and the blending assembly to be simultaneously stored within the body.

2. An apparatus according to claim 1 in which the body is adapted to receive water adjacent the heating means, for conversion to steam by the heating means, in order to allow food to be steamed within the body.

3. An apparatus according to claim 1 in which the body comprises a base within which the heating means is located, and a cylindrical sidewall extending from the base, such as to define an enclosure within which food may be placed for heating; blending.

4. An apparatus according to claim 3 in which the cylindrical sidewall comprises an inner wall and a concentrically located outer wall defining a cavity therebetween.

5. An apparatus according claim 1 comprising a top within which the drive means is located, the top being securable to the body.

6. An apparatus according to claim 1 in which, when the perforated bowl is mounted within the body, a space exists between the perforated bowl and the base, for receiving water for conversion to steam.

7. An apparatus according to claim 1 in which the perforated bowl has an aperture therein through which the blending assembly may project.

8. An apparatus according to claim 1 in which the container is substantially cylindrical and has a single open end which is engageable about a rim of the perforated bowl in order to increase the effective volume of the perforated bowl.

9. An apparatus according to claim 8 comprising a lid securable about the open end of the container, the lid having an aperture for the passage of the blending assembly, thereby allowing the lid to be secured to the container during blending.

10. An apparatus according to claim 1 in which the temperature of the heating means may be varied.

11. An apparatus according to claim 1 further comprising a lid and a top within which the drive means is located, in which the apparatus may be stored with the container within the body, the perforated bowl within the container, the blending assembly within the container and projecting through the perforated bowl, the lid mounted to the container and the top mounted to the body such as to enclose the container/bowl/blade assembly therein.

12. An apparatus for preparing food comprising
a body within which food may be placed;
heating means in operative association with the body, such that food may be heated within the body;
drive means in operative association with the body; and
a blending assembly locatable within the body, in operative association with the drive means, such that food may be blended within the body;
a perforated bowl removably locatable within the body, in which bowl food may be placed for heating;
a substantially cylindrical container removably locatable within the body, the container being shaped and dimensioned to substantially receive the blending assembly therein, in order to allow food to be blended within the container, and in which container the perforated bowl may be substantially housed in order to allow the perforated bowl, the container, and the blending assembly to be simultaneously stored within the body, the container having a single open end that is engageable about a rim of the perforated bowl in order to increase the effective volume of the perforated bowl and
a lid securable about the open end of the container, the lid having an aperture for the passage of the blending assembly, thereby allowing the lid to be secured to the container during blending in which the lid comprises a panel displaceable between a position exposing the aperture, and a position occluding the aperture.

* * * * *